US008005364B2

(12) United States Patent
Lundholm et al.

(10) Patent No.: US 8,005,364 B2
(45) Date of Patent: *Aug. 23, 2011

(54) METHOD AND APPARATUS FOR COMMUNICATING IN THE PRESENCE OF RADIO FREQUENCY ENERGY

(75) Inventors: Andrew S. Lundholm, Hoffman Estates, IL (US); Chris Grivas, Crystal Lake, IL (US); Jeffrey T. Curtis, Lake Villa, IL (US); Julius S. Gyorfi, Lake Bluff, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 170 days.

This patent is subject to a terminal disclaimer.

(21) Appl. No.: 10/896,490

(22) Filed: Jul. 22, 2004

(65) Prior Publication Data
US 2005/0008371 A1    Jan. 13, 2005

Related U.S. Application Data

(63) Continuation of application No. 09/440,882, filed on Nov. 16, 1999, now Pat. No. 6,782,208.

(51) Int. Cl.
*H04B 10/00*    (2006.01)
(52) U.S. Cl. .................. 398/115; 398/116; 398/128
(58) Field of Classification Search .......... 398/115–116, 398/124, 128, 130
See application file for complete search history.

(56) References Cited

U.S. PATENT DOCUMENTS

| | | | |
|---|---|---|---|
| 4,904,993 A | 2/1990 | Sato | |
| 4,972,455 A | 11/1990 | Phillips et al. | |
| 5,034,997 A | 7/1991 | Iwasaki | |
| 5,138,649 A | 8/1992 | Krisbergh et al. | |
| 5,309,502 A | 5/1994 | Hirai | |
| 5,343,319 A | 8/1994 | Moore | |
| 5,500,691 A | 3/1996 | Martin et al. | |
| 5,585,953 A * | 12/1996 | Zavrel | 398/115 |
| 5,659,883 A | 8/1997 | Walker et al. | |
| 5,675,395 A | 10/1997 | Martin et al. | |
| 5,907,418 A | 5/1999 | Walczak et al. | |
| 5,929,770 A * | 7/1999 | Faita | 340/10.41 |
| 5,930,706 A | 7/1999 | Raith | |

(Continued)

FOREIGN PATENT DOCUMENTS

DE    44 33 896 C1    11/1995

(Continued)

OTHER PUBLICATIONS

Weng Guirong, Zhao Heming, Gue Hong; "Studies on Miniature Wireless Transmission of Time-Division Multiplexing"; Journal of Suzhou University (Natural Science) vol. 13 No. 3; Jul. 1997.

(Continued)

*Primary Examiner* — Dzung Tran
(74) *Attorney, Agent, or Firm* — Roland K. Bowler II

(57) ABSTRACT

A wireless communication device (10) includes a radio frequency transceiver (22) adapted for burst transmission responsive to an enable signal in accordance with at least one communication protocol and an infrared transceiver (24) adapted for asynchronous data communication. The infrared transceiver (24) is responsive to the enable signal to suspend data communication. A controller (20) is coupled to each of the radio frequency transceiver (22) and the infrared transceiver (24), and the controller (20) is operable to generate the enable signal in accordance with the at least one communication protocol.

21 Claims, 2 Drawing Sheets

U.S. PATENT DOCUMENTS

| | | | |
|---|---|---|---|
| 5,946,120 A * | 8/1999 | Chen | 398/155 |
| 5,999,294 A | 12/1999 | Petsko | |
| 6,081,356 A | 6/2000 | Branc et al. | |
| 6,093,146 A | 7/2000 | Filangeri | |
| 6,104,512 A * | 8/2000 | Batey et al. | 398/120 |
| 6,119,023 A * | 9/2000 | Tomiyori | 455/574 |
| 6,396,612 B1 | 5/2002 | Bjorndahl | |
| 6,424,285 B1 * | 7/2002 | Perdue et al. | 341/176 |
| 6,549,567 B1 * | 4/2003 | Fullerton | 375/219 |
| 6,574,482 B1 * | 6/2003 | Radomsky et al. | 455/517 |
| 6,782,208 B1 * | 8/2004 | Lundholm et al. | 398/135 |
| 7,089,033 B2 | 8/2006 | Leinonen et al. | |
| 7,095,730 B1 | 8/2006 | Raaf | |
| 7,177,280 B2 | 2/2007 | Aoki | |
| 7,239,615 B2 | 7/2007 | Nevo et al. | |
| 7,366,128 B2 | 4/2008 | Hundal et al. | |
| 2002/0176385 A1 | 11/2002 | Huh et al. | |
| 2003/0060206 A1 | 3/2003 | Sointula et al. | |
| 2004/0063425 A1 | 4/2004 | Wakutsu et al. | |
| 2004/0127185 A1 | 7/2004 | Abrahams et al. | |
| 2004/0176039 A1 | 9/2004 | Leyh et al. | |
| 2004/0218562 A1 | 11/2004 | Orava et al. | |
| 2006/0135195 A1 | 6/2006 | Leinonen et al. | |
| 2006/0197538 A1 | 9/2006 | Leinonen et al. | |
| 2006/0217139 A1 | 9/2006 | Gunzelmann et al. | |
| 2007/0047625 A1 | 3/2007 | Klomsdorf et al. | |

FOREIGN PATENT DOCUMENTS

| | | |
|---|---|---|
| JP | 09091916 | 10/1998 |
| WO | WO 95/05709 | 2/1995 |

OTHER PUBLICATIONS

Journal of Suzhou University, Jul. 1997.

3 Pages of English Translation of Journal of Suzhou University, Jul. 1997.

* cited by examiner

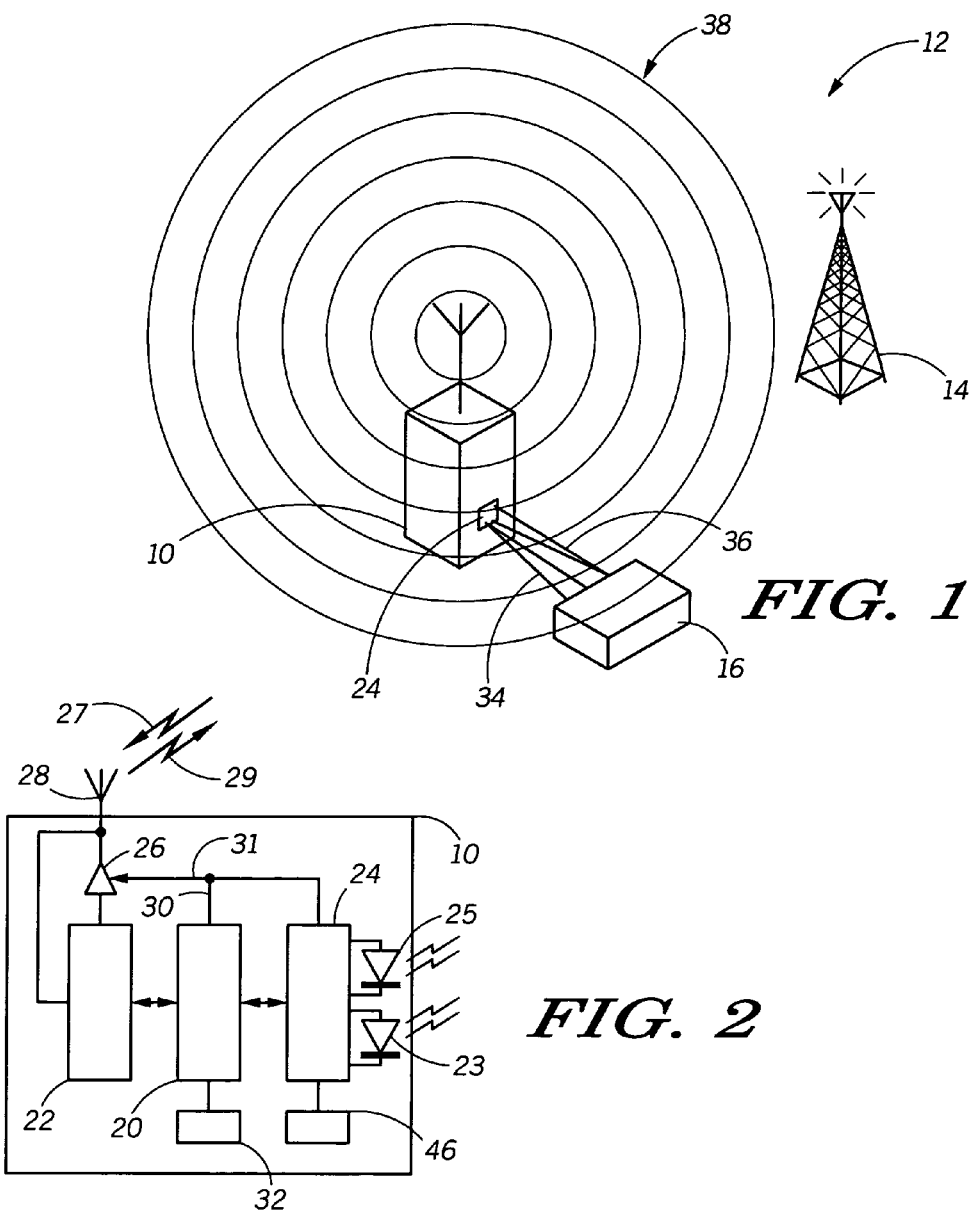
FIG. 1
FIG. 2
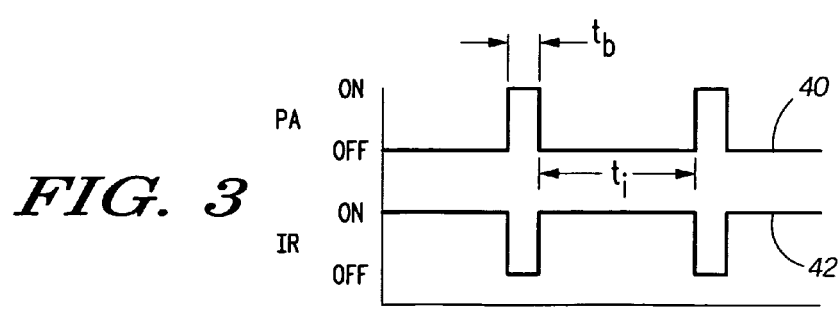
FIG. 3

METHOD AND APPARATUS FOR COMMUNICATING IN THE PRESENCE OF RADIO FREQUENCY ENERGY

CROSS REFERENCE TO RELATED APPLICATIONS

The present application is a continuation of co-pending and commonly assigned U.S. application Ser. No. 09/440,882 filed on Nov. 16, 1999 now U.S. Pat. No. 6,782,208, the subject matter of which is incorporated herein by reference and from which benefits under 35 U.S.C. 120 are hereby claimed.

BACKGROUND

The present disclosure relates generally to communication systems, and more particularly to methods and apparatuses for communicating using radiant energy signals in the presence of radio frequency energy.

The capabilities, features and functions of wireless communication devices, such as cellular radiotelephones, pagers and the like, have expanded tremendously and continue to grow. Within the devices themselves, for example, it is now possible to store and retain numerous names with associated phone numbers and addresses. It is also possible to keep an appointment calendar, task list and other personal organizer information within the memory of the wireless communication device. While the wireless communication device is typically designed to utilize one or more wireless communication standards for providing primary two-way voice and data communications via a communication network, to facilitate the exchange of data between devices, e.g., between other wireless communication devices, personal computers (PCs), personal digital assistants (PDAs), and the like, a secondary, low-power data transmitter and receiver may be provided.

Infrared (IR) communication technology provides a convenient form of low-power, limited range, wireless data transmission. Hence, it is not surprising that this technology has been adapted to wireless communication devices to allow these devices to communicate with other such devices and with IR capable PCs, PDAs and the like. For example, low cost, compact modules, such as the HSDL-3201 IrDA data transceiver available from Hewlett-Packard, are designed for adaptation to wireless communication devices and provide relatively fast data transfer using IR transmission and reception. These devices may provide a communication link from between 20-100 centimeters (cm), and data transmission rates up to 115.2 kilobits/second (kb/s).

A complication that arises from the inclusion of IR transceivers in radio frequency (RF) wireless communication devices relates to the electromagnetic fields produced by the wireless communication device. For example, a cellular radiotelephone may produce an electromagnetic field in close proximity to the antenna as high as 1 volt/meter. This field strength can effect electronic devices within a range of up to a meter. As noted, commercially available IR transceivers are typically designed to operate within about 20-30 cm, which is well within the relatively strong RF field created by the wireless communication device.

A problem arises if the electronic devices do not operate correctly in the presence of the large RF fields. While the wireless communication device is designed to operate within these fields, and therefore, is unlikely to have its operation effected by them, many peripheral devices may not be so tolerant. And, even where a device is designed with appropriate shielding and filtering to guard against anomalous circuit operation and to reject noise generated as a result of the field, if the field is strong enough, operation of the device may still be adversely effected. The end result is an end user that is dissatisfied with the performance of the wireless communication device and/or the peripheral device for exchanging data.

One reason why these devices may be affected by the RF field is found in the design of the peripheral device. For example, the conductive traces and wiring leads within the peripheral device act like antennas to the RF field thereby coupling the RF energy from the field into the transceiver circuit. Also, the IR module includes a receiver, and the receiver will necessarily include amplifiers and other non-linear devices. It is possible, in the presence of a strong enough RF field, that these devices will actually rectify the RF energy within the field generating a current wave. This current wave can easily overload the following circuit elements. Furthermore, the transimpedance amplifier typically found in IR receivers can convert the current wave to a noise voltage thereby reducing the signal-to-noise ratio significantly. Thus, there is a need for an apparatus and method for communicating in the presence of RF energy.

BRIEF DESCRIPTION OF THE DRAWINGS

FIG. 1 is a schematic illustration of a wireless communication device in communication with a peripheral device.

FIG. 2 is a block diagram illustration of a wireless communication device in accordance with a preferred embodiment of the invention.

FIG. 3 is a timing diagram illustrating operation of the wireless communication device shown in FIG. 2.

DETAILED DESCRIPTION

Figure 4:
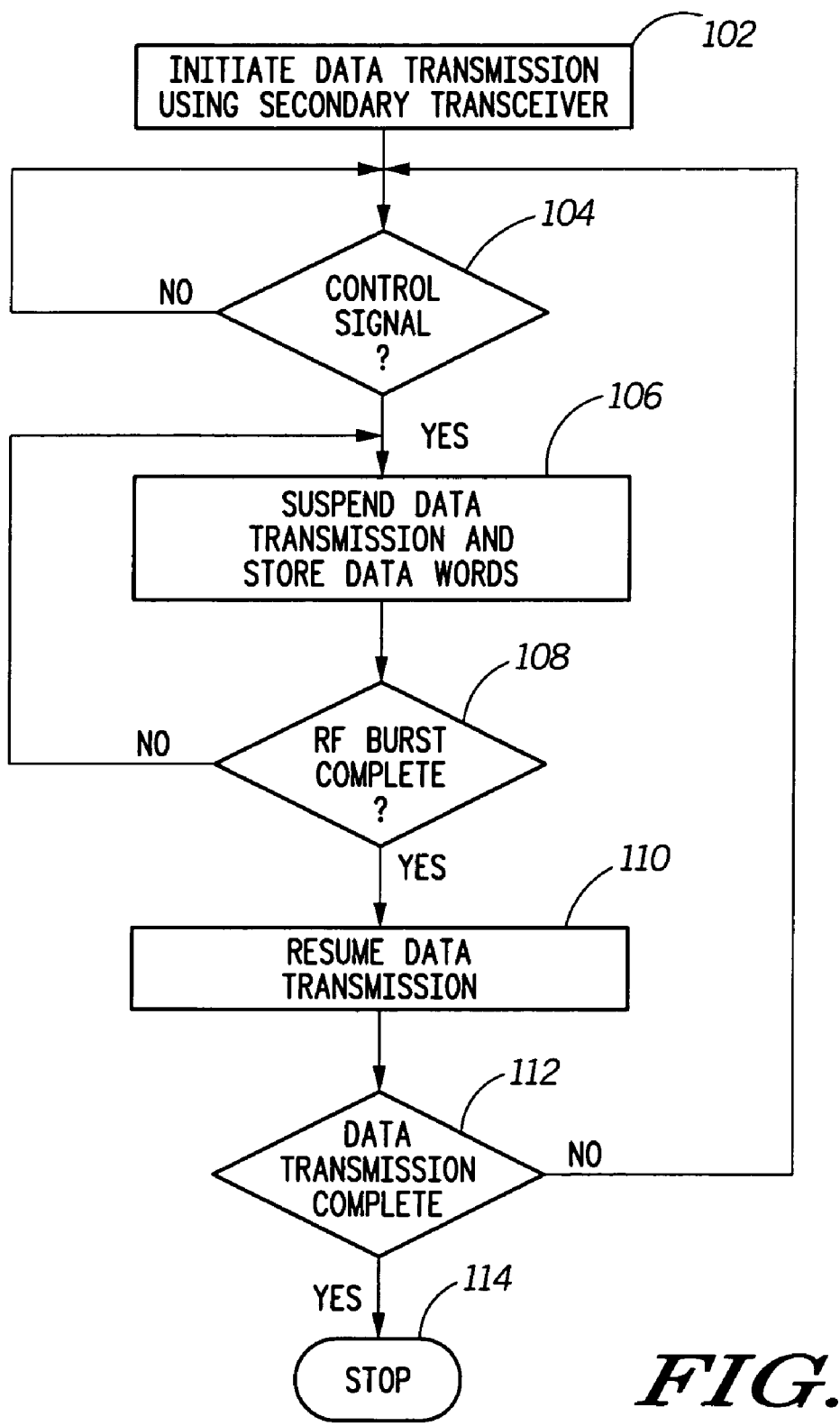
FIG. 4 is a flow chart illustrating a method of communicating in accordance with a preferred embodiment of the invention.

Referring to FIG. 1, a wireless communication device 10 operates in accordance with one or more communication standards within a wireless communication system 12. For example, the wireless communication device 10 and the wireless communication system 12, generally, may operate in accordance with one or more communication standards for cellular telephony, such as without limitation, either or both of the GSM900, DCS1800 and PCS 1900 standards.

Wireless communication device 10 communicates via radio frequency signals with one or more base stations (one shown as base station 14) in accordance with the governing communication standard. Preferably, the wireless communication device 10 includes numerous functions in addition to providing wireless voice communication, and in accordance with a preferred embodiment of the invention, the wireless communication device 10 includes a secondary communication capability. The secondary communication capability may be in the form of a secondary infrared (IR) transceiver, such as, for example, the aforementioned HSDL-3201, IrDA transceiver from Hewlett Packard. Using this secondary communication capability, the wireless communication device 10 is capable of communicating data to other equally capable wireless communication devices, such as cellular radiotelephones and pagers, and other devices such as PCs, printers, and PDAs. These other devices are generally illustrated in FIG. 1 as peripheral device 16. In this manner, data within the wireless communication device 10, such as names and associated phone numbers and addresses, calendar data, task lists, notes, email, and the like may be exchanged with the peripheral device 16, and the data stored within both devices may be synchronized.

With reference to FIG. 2, the wireless communication device 10 includes a processor 20 that is coupled to an RF communication module 22 and an IR communication module 24. The RF communication module 22 may receive voice and/or data signals directly from the processor 20 (as shown in FIG. 2), or may receive signals directly from other sources. Under the control of processor 20, the RF communication module 22 codes and modulates these signals for transmission. The RF communication module 22 also operates in a receive mode for receiving, demodulating and decoding signals 27 received at an antenna 28.

The RF communication module 22 has an output coupled to a power amplifier 26, and the power amplifier 26 is coupled to the antenna 28. The processor 20 directly communicates with the power amplifier 26 via a control line 30 for providing an enable signal to the power amplifier 26. Responsive to the enable signal, the power amplifier 26 is capable of amplifying the coded and modulated signal from the RF communication module 22 for transmission from the antenna 28. The processor 20 may also provide a pre-enable signal indicating an imminent RF transmission prior to providing the enable signal activating the power amplifier 26.

The IR communication module 24 is also coupled to the processor 20 and data signals received by the IR communication module 24 from the processor 20 are coded and modulated for transmission via an IR light emitting diode (IR-LED) 25. The IR communication module 24 receives control signals from the processor 20 via a control line 31. The IR communication module 24 is also operable in a receive mode, wherein IR signals received at either at a photodiode 23 within the IR communication module 24 are demodulated and decoded.

The processor 20 is coupled to a memory 32 that contains at least several data structures. For example, one data structure contains the program instructions that govern the operation of the processor 20, and hence the function of the wireless communication device 10. Another data structure contains various operating data required for the proper functioning of the wireless communication device 10. The memory 32 may also include a data structure wherein various other data, such as names, phone numbers, addresses, calendar data, and the like, are stored. This data may be manually input into the wireless communication device 10, for example, using a keypad (not depicted), or the data may be downloaded to the wireless communication device 10. The IR communication module 24 provides the capability to download data from the memory 32 and or to write data to the memory 32 from a source external to the wireless communication device 10. It will be appreciated that while shown as a single memory element, the memory 32 may be implemented as several memory devices.

With reference again to FIG. 1, the wireless communication device 10 and the peripheral device 16 operate in close proximity, e.g., within about 20-100 cm. The wireless communication device 10 sends data to the peripheral device 16 via IR signals 34 and receives data from the peripheral device 16 via IR signals 36. The IR signals 34 and 36 are structured in accordance with one or more well known IR communication protocols with each transmitted word including a start bit and a stop bit in asynchronous communication.

The wireless communication device 10 and the peripheral device 16 further operate in the presence of an RF energy field 38 generated in proximity to the antenna 28. The RF energy field 38 results from the transmission of RF communication signals 27 from the wireless communication device 10 to the base station 14. The RF energy field 38 may significantly impair, if not entirely degrade, the ability of the peripheral device 16 to communicate using the IR data signals 34. This is because, as described above, many peripheral devices with which the wireless communication device 10 may be arranged to communicate may not be designed to adequately shield and/or filter the interference presented by the RF energy field 38.

In accordance with the various wireless communication protocols, however, the RF energy field 38 does not exist continuously. Instead, the wireless communication device 10 may communicate by sending periodic bursts of RF energy. For example, in accordance with the GSM standard, the power amplifier 26 is a pulsed device. Responsive to the enable signal from the processor 20, the power amplifier 26 transmits a 542.8 microsecond burst at a 217 Hertz (Hz) repetition rate. The pulsed operation of the power amplifier 26 may be advantageously exploited in accordance with a preferred embodiment of the invention to enhance communications between the wireless communication device 10 and the peripheral device 16 using the IR signals 34 and 36.

First, it should be recognized that priority within the wireless communication device 10 resides with sending the RF communication signals 27, and hence, eliminating the existence of the RF energy field 38 entirely during IR signal transmission may not be possible. However, given that the RF communication signals 27 are sent in a burst format, the periods between the bursts may be exploited for sending the IR signals 34 from the wireless communication device 10 to the peripheral device 16. IR signals 36 transmitted from the peripheral device 16 to the wireless communication device 10 should not be problematic as the wireless communication device 10, being designed to operate in the presence of RF energy, will not generally be adversely effected for receiving the IR signals 36 from the peripheral device 16. The same is not necessarily true, however, of the peripheral device 16.

With reference to FIG. 3, trace 40 represents the burst operation of the power amplifier 26 for transmitting RF communication signals form the wireless communication device 10 to the base station 14. The trace 42 represents the operation of the IR communication module 24 for transmitting the IR signals 34 to the peripheral device 16. As observed, the IR signals 34 are transmitted during the portion of time, $t_i$, during which the power amplifier 26 is idled, in accordance with the communication standard.

With reference again to FIG. 2, on the control line 31 coupled between the processor 20 and the IR communication module 24, the processor is capable of sending to the IR communication module 24 either or both of the pre-enable signal or the enable signal. The IR communication module 24 is then responsive to either the pre-enable signal or the enable signal to suspend transmission of the IR signals 34. In accordance with the preferred embodiments of the invention, several strategies may be implemented in connection with suspending and restarting transmission of the IR signals 34.

As shown in FIG. 2, a hardware memory 46 is coupled to the IR communication module 24, although the memory may be provided internal to the IR communication module 24. Upon receipt of either the pre-enable or the enable signal, the IR communication module 24 may suspend immediately, mid-word, and begin storing data words that are to be transmitted in the memory 46. When the enable signal is no longer present, the IR communication module 24 can at the appropriate time resume transmission of the IR signals, beginning with the data words retained in the memory 46, while storing newly received data words within the memory 46. There may be a slight pause before the transmission of data words is resumed to permit the RF energy field 38 to fully dissipate. Alternatively, the memory 46 may be implemented using software, wherein the data words are addressed and stored within a random access memory portion of the wireless communication device 10. It should be further appreciated that the memory need not be provided with the IR communication module 24, but instead memory 32 may include an additional data structure that is arranged to provide the temporary storage function.

To prevent suspension of an IR transmission mid-word, either the IR communication module 24 or the processor 20 may be responsive to the pre-enable signal to determine if sufficient time exists within which to transmit the next word. If there is insufficient time to transmit the next word, the next word may be stored with the memory 46, as described, along with each subsequent data word until the IR communication module 24 may resume transmission.

In still another preferred embodiment of the invention, the IR communication module 24 may be adapted to, upon receipt of the pre-enable and/or the enable signal, to begin storing the data words that would be transmitted during the RF burst while continuing to transmit the data words in the IR signals 34. The peripheral device 16 may or may not receive the data words, however, if the data words are not received or are corrupted, the peripheral device 16 may be programmed to request that specific data words be resent. Communication of the IR signals 34 is continuous, and transmission is repeated from the memory 46 for those data words that may have been corrupted as a result of the RF burst. However, an advantage of the present invention is a reduction in the peak power requirement of the communication device 10. Because the IR signals are suspended during the RF burst, the IR transmitter and the RF transmitter are not operated simultaneously. Since the IR transmitter and the RF transmitter typically have the highest power requirements within the communication device 10, the present invention provides the added advantage of reducing the peak power requirement.

By suspending transmission of the IR signals 34 during the RF burst, however, the effective data rate for the IR transmission is reduced by a factor corresponding to the transmission rate of the RF burst. For example, the RF burst specified by the GSM900 standard is an ⅛ rate burst. Thus, the effective data rate for the IR transmission, which may normally be specified as 115.2 kb/s, will be reduced to about 100.8 kb/s.

So far the invention has been described in terms of the wireless communication device 10 having a secondary transceiver for communication of data between the wireless communication device 10 and the peripheral device 16 wherein the secondary transceiver is an IR transceiver module. However, the invention is not so limited. The present invention has application where the data communication between the wireless communication device 10 and the peripheral device 16 is accomplished using low power RF transmissions. Alternatively, pulsed lasers and other optical transmission devices other than IR may also be used without departing from the fair scope of the present invention. Additionally, the invention is not limited to the situation where the offending energy field is the result of an RF transmission.

Referring now to FIG. 4, a method 100 for communicating in the presence of RF energy in accordance with a preferred embodiment of the invention is illustrated in flow chart form. At step 102, data transmissions are initiated between the wireless communication device 10 and the peripheral device 16 using the secondary transceiver arrangement of the wireless communication device 10. At step 104, processor 20 generates a power amplifier enable signal. Responsive to the power amplifier enable signal, at step 106 the IR communication module 24 within the wireless communication device 10 suspends transmission of IR signals and begins buffering of the data words in the memory 46, step 108. Once the enable signal is no longer present, IR transmissions are resumed by the wireless communication device 10, step 112, the data words retained within the memory 46 are transmitted and data transmission continues, step 114, until completed, step 118.

The resumption of the IR transmission may be delayed slightly following passage of the enable signal, and hence, the suspended transmission period may be slightly longer than the actual duration of the RF burst. The slightly longer duration permits the RF energy field to sufficiently dissipate so as to not have an adverse effect upon resumption of the IR transmissions. In addition, at steps 104 and 106, the processor 20 may generate a pre-enable signal, the IR communication module 24 may be responsive to the pre-enable signal to suspend further IR transmissions and to begin storing data words for the duration of the RF burst. Step 106 may further include determining based upon receipt of the pre-enable signal, if a next data word may be sent prior to the oncoming RF burst, and if so, transmitting the next data word.

Still other modifications and alternative embodiments will be apparent to those skilled in the art in view of the foregoing description, which is to be construed as exemplary and for the purpose of teaching those of ordinary skilled the best mode thereof. The details of the structure and method may be varied substantially without departing from the spirit of the invention, and the exclusive use of all modifications which come within the scope of the appended claims is reserved.

What is claimed is:

1. A wireless communication device comprising:
a controller for generating a control signal;
a first communication module coupled to the controller, the first communication module communicating a pulsed signal responsive to the control signal; and
a secondary communication module coupled to the controller,
the second communication module communicating a second signal, the second communication module responsive to the control signal to suspend an ongoing transmission of the second signal for a duration of the pulsed signal.

2. The wireless communication device of claim 1, wherein the first communication module comprises a radio frequency transceiver adapted for burst operation.

3. A portable communication device comprising:
a controller having a control signal output;
a first communication module coupled to the control signal output of the controller;
a second communication module coupled to the control signal output of the controller,
the first communication module providing a first signal having a signal duration in response to a control signal on the control signal output of the controller,
the second communication module interrupting an ongoing communication of a second signal during the communication of the first signal in response to the control signal on the control signal output of the controller.

4. The portable communication device of claim 3, the secondary communication module resuming interrupted communications of the second signal after the signal duration of the first signal.

5. A method in a portable communication device, the method comprising:
transmitting a first signal as a series of pulses separated by intervals of inactivity;

transmitting a second signal only during the intervals of inactivity of the first signals;

interrupting the communication of the second signal during the pulses of the first signal.

6. The method of claim 5, after interrupting, resuming the communication of the second signal during the intervals of inactivity of the first signal.

7. The method of claim 5, controlling the communication of the first signal and the interruption of the second signals with a common control signal.

8. A method in a communication device, the method comprising:

communicating a first signal as a series of pulses separated by intervals of inactivity;

communicating a second signal;

interrupting the communication of the second signal during the pulses of the first signal;

resuming transmission of the second signal during the intervals of inactivity of the first signal.

9. The method of claim 8, communicating the first signal in response to a control signal;

interrupting the communication of the second signal in response to a control signal.

10. The method of claim 9, nterrupting communication of the second signal in response to the same control signal in response to which the first signal is communicated.

11. The method of claim 8, communicating the first signal as a series of pulses separated by intervals of inactivity includes transmitting the first signal.

12. A method in a wireless communications device, the method comprising:

communicating a pulsed signal having pulses separated by corresponding intervals of inactivity;

communicating a second signal at virtually the same time that the pulsed signal is communicating by communicating the second signal during the intervals of inactivity between pulses and interrupting communicating of the second signal during the pulses of the pulsed signal.

13. The method of claim 12, communicating the pulsed signal in response to a control signal, interrupting communication of the second signal in response to a control signal.

14. The method of claim 12, communicating the pulsed signal includes transmitting the pulsed signal.

15. A method in a communication device having a first communication module and a second communication module coupled to a controller, the method comprising:

communicating a first signal from the first communication module in response to a control signal from the controller;

interrupting communication of a second signal from the second communications module in response to the control signal;

resuming the communication of the second signal upon completion of the communication of the first signal.

16. The method of claim 15, communicating the first signal for a first signal duration, interrupting the communication of the second signal during the first signal duration, resuming the communication of the second signal after the first signal duration.

17. The method of claim 15, communicating the first signal as multiple bursts in response to a corresponding control signal, the multiple bursts each having a burst duration and separated by an interval between bursts, interrupting the communication of the second signal during each burst duration, resuming the communication of the second signal during the interval between bursts.

18. A method in a communication device, the method comprising:

receiving a pre-enable signal indicative that a signal will be communicated within a predetermined time period;

determining whether another signal can be communicated before the predetermined time period expires;

communicating the other signal only if the other signal may be communicated before the predetermined time period expires.

19. The method of claim 18, determining whether the other signal can be communicated before the predetermined time period expires includes determining whether an ongoing communication of the other signal may be completed before the predetermined time period expires.

20. The method of claim 19, completing communication of the other signal only if communication of the second signal may be completed before the predetermined time period expires.

21. The method of claim 19, interrupting communication of the other signal if communication of the other signal cannot be completed before the predetermined time period expires.

* * * * *